Patented May 19, 1931

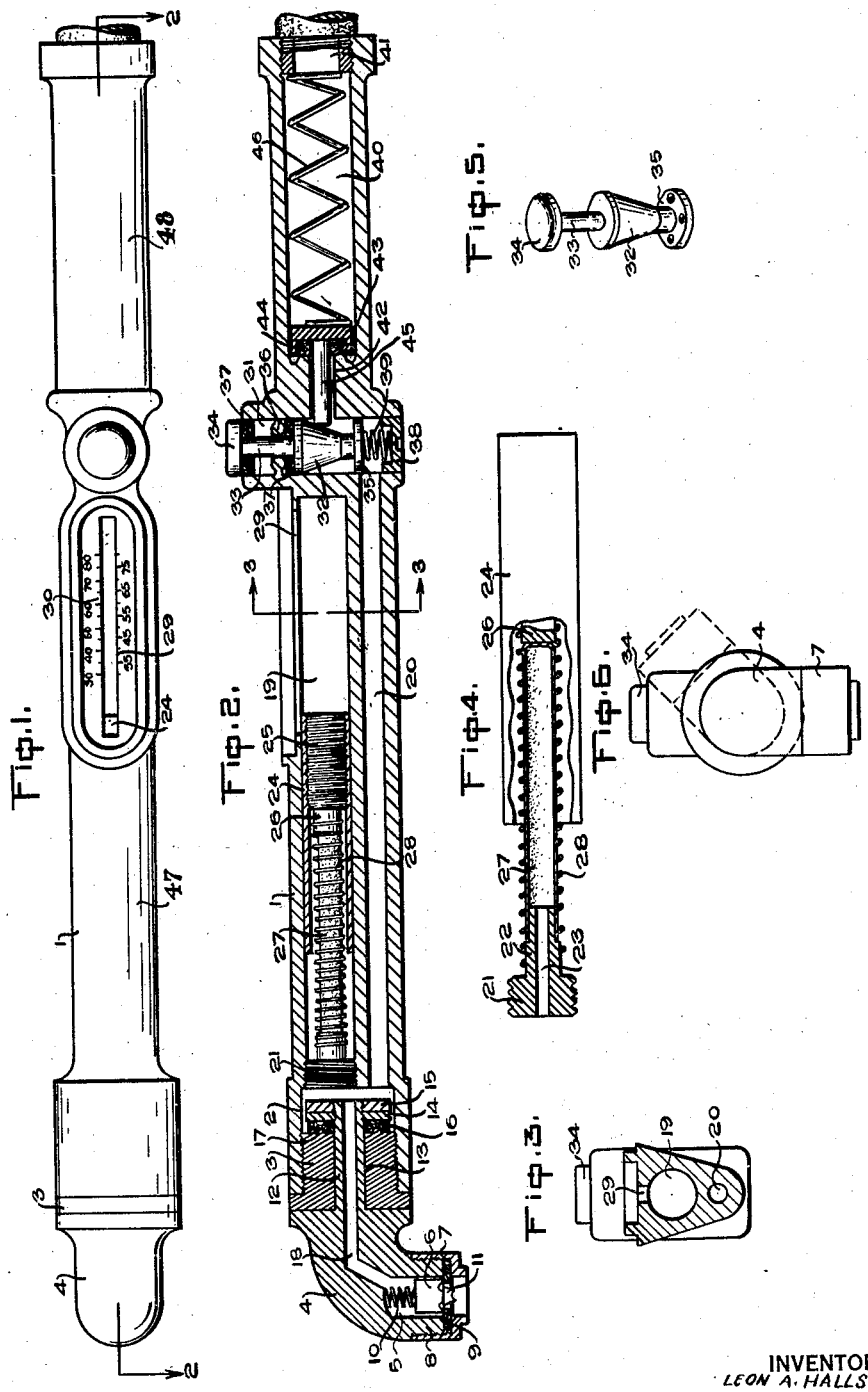

1,805,869

UNITED STATES PATENT OFFICE

LEON ARTHUR HALLSTEAD AND HERBERT DAWSON, OF BUFFALO, NEW YORK, ASSIGNORS, BY MESNE ASSIGNMENTS, TO H. D. TAYLOR CO., OF BUFFALO, NEW YORK, A CORPORATION OF NEW YORK

AIR PRESSURE GAUGE

Application filed November 24, 1924. Serial No. 752,052.

Our invention relates to improvements in air pressure gauges, and the object of the invention is to construct an air line nozzle in which a tire air pressure gauge is incorporated.

A further object of the invention is to construct a nozzle having a manually controlled air inlet valve.

A still further object of the invention is to provide a rotatable outer end on the nozzle so as to permit the air pressure gauge which is incorporated therein to be in view irrespective of the position of the tire valve to which the nozzle is applied.

Our invention consists of an air pressure gauge constructed and arranged all as hereinafter more particularly described and illustrated in the accompanying drawings in which:—

Fig. 1 is a plan view of our device.

Fig. 2 is a vertical sectional view through the line 2—2, Fig. 1.

Fig. 3 is a cross sectional view through the line 3—3, Fig. 2.

Fig. 4 is an enlarged part sectional detail of the air pressure recording means.

Fig. 5 is a perspective view of the plunger for actuating the air inlet valve.

Fig. 6 is an end elevational view of the nozzle showing in dotted lines the rotatable movement of the end in respect to the main portion.

Like characters of reference indicate the corresponding parts in the different views.

1 designates a substantially tubular casing provided in the outer end with the nozzle chamber 2, such chamber being threaded and adapted to receive the shouldered bushing 3, which is threaded thereinto.

4 is the rotatable outer end of the nozzle which is turned over at right angles to the main portion and provided on its outer end with an orifice 5 adapted to receive the valve 6.

7 is an interiorly threaded tire valve engaging portion threaded onto the reduced portion 8 of the nozzle 4, and 9 is a washer constructed of rubber or other suitable material and interposed between the portion 7 and the face of the reduced portion 8. The orifice in such washer being of less diameter than the orifice 5 in the portion 4. The valve 6 is adapted to be seated thereon and is held in place by the spiral spring 10.

11 is a projecting lug on the outer face of the valve 6 adapted to engage the plunger of the tire valve and open it in the usual manner when the nozzle is applied. The rotatable portion 4 is provided on its inner end with reduced portion 12 adapted to be inserted into the orifice 13 of the bushing 3 and held in engagement therewith by the locknuts 14 and 15 which are threaded onto the end of the portion 12.

16 is a washer of rubber or similar material adapted to be inserted between the nut 14 and the inner face of the bushing 3, such inner face being provided with a circular lip 17 which presses into the coacting face of the washer 16 and constitutes an air tight joint, and 18 is a passage leading from the orifice 5 to the outer end of the portion 12.

The casing 1 is provided with a cylindrical gauge chamber 19 and an air passage 20 both of which extend longitudinally of the casing and communicate with the nozzle chamber 2, the cylindrical gauge chamber 19 being adapted to receive the pressure gauge which we shall now describe. The outer end of the chamber 19 which communicates with the nozzle chamber 2 is threaded and receives a threaded bushing or anchor member 21 which is provided with reduced portion 22 on its inner face, and 23 is a passage extending through the bushing 21 and the portion 22.

24 is a sleeve of the same diameter as the passage 19 and adapted to slide therein, one end of such sleeve being interiorly threaded and receiving the plug 25 which has a reduced inner portion 26 of the same diameter as the portion 22. The inner end of the portion 22 is slightly reduced and receives the outer end of a rubber sleeve 27, the other end of which is sealed and in contact with the face of the portion 26.

28 is a spiral spring which fits over the sleeve 27, its ends encircling the respective portions 22 and 26. 29 is a slot provided in one end of the passage 19 through which the end of the sleeve 24 can be seen, and 30 is a dial provided with pressure indicating numerals provided on the outer face of the nozzle along one side of the slot 29. By unscrewing the anchor member 21 the gauge may be removed as an entirety through the nozzle member 2. From an inspection of Fig. 1 it will be noted that the dial 30 is located intermediate of the ends of the casing 1 so as to provide hand holds 47 and 48 on each side thereof, one of which is adapted to be gripped by one hand in positioning the nozzle over the tire valve and the other adapted to be gripped by the other hand in operating the air inlet valve. The nozzle may thus be conveniently handled without obscuring the gauge from view by the hands and may be inserted between the spokes of the wheels without bringing the hands into proximity thereto.

31 is a transverse bore formed in the casing 1 at the inner closed end of the cylindrical gauge chamber 19 and adapted to receive the inlet valve actuating plunger which is reciprocal therein. The main portion of a plunger consists of an inverted cone shaped member 32 having an upwardly extending stem 33. The upper end of such stem is provided with a button 34. The lower end of the portion 32 is provided with a perforated disc 35, such disc and the larger end of the conical portion being of the same diameter and adapted to slide in the passage 31.

36 is a flange formed integrally with the portion 1 and provided in the passage 31 to act as a stop for the plunger therein.

37 are a pair of washers constructed of rubber or like material being of the same diameter as the passage 31, and inserted thereinto one on either side of the flange 36.

38 is a plug threaded into the lower end of the passage 31, and 39 is a spiral spring interposed between such plug and the lower face of the perforated disc 35. The end of the passage 20 communicates with the lower end of the passage 31 as it is clearly illustrated in Fig. 2. The inner end of the casing 1 is formed to provide an air inlet valve chamber 40, the outer end of which is internally threaded and receives the threaded bushing 41 on the outer end of which the air line hose is secured.

42 is a circular passage passing from the inner end of the inlet valve chamber 40 and communicating with the transverse bore 31 intermediately of its length. 43 is a flat circular valve, the inner face of which is recessed and adapted to receive the rubber washer 44 which engages a circular lip upon the inner end of the inlet valve chamber 40, and 45 is the valve stem secured to the valve 43 and slidable in the passageway 42 the outer end of such valve stem being in contact with the cone shaped portion 32 of the plunger.

46 is a spiral spring interposed between the outer face of the valve 44, and the bushing 41, such spring being provided to keep the face of the rubber washer 44 in contact with the lip 42.

The operation of our device is as follows:—

When the nozzle is applied to an automobile tire valve the plunger portion 32 is in its normal inoperative position, and the valve 44 is closed which prevents the air under pressure in the air line passing beyond the inlet valve chamber 40. When the lug 11 on the valve 6 comes into contact with the plunger in the tire valve, such plunger will be depressed thus opening the valve and permitting the air from the tire to enter into the orifice 5 and pass from thence through the passage 18 into the nozzle chamber 2 from whence it will pass through the passage 23 in the bushing 21 and portion 22, into the rubber sleeve 27. As the rubber sleeve 27 is positioned in the spiral spring 28 it will not be permitted to expand diametrically under the influence of the air pressure, but will be extended longitudinally and move the sleeve 26 along the cylindrical gauge chamber 19, and as the exterior of the slot 29 is suitably graduated the particular air pressure in the tire will be shown.

If the tire needs inflating the button 37 on the plunger is pressed downwardly with the thumb, its movement causing the inverted conical portion 32 of the plunger to also move downwardly, thus pushing the valve stem 45 in the direction of the inlet valve chamber 40 and opening the valve 44 which permits the air pressure from the air line to pass around the valve and valve stem through the passage 42 into the passage 31, and through the perforated disc 35 into the passage 20 from where it passes through the passage 18 and orifice 5 and past the open valve 6 into the tire valve in the usual manner. Upon desiring to ascertain the air pressure in the tire it is merely necessary to release the button 37 when the plunger will be restored to its initial position under the influence of the spring 39 when the valve 44 will shut, thus cutting off the air supply. Immediately this is done the air pressure from the tire will reenter the orifice 5 and pass from thence into the rubber sleeve 27, thus recording the pressure as before described.

On reference to Fig. 2 it will be seen that the end of the nozzle is secured to the main portion in such a manner that it is rotatable therein, the inwardly extending portion 12 being rotatable in the bushing 3. The rubber washer 16 between the lock nuts and the inner face of the bushing constitutes an air tight joint. With this feature on our device it is always possible to have the gauge portion of the nozzle facing upwardly irrespective of the position of the tire valve, it being merely necessary to turn such outer portion around, that is if the valve is near the ground the end is in the position shown in full lines in Figure 6, or if the valve is at the upper side of the wheel the end of the nozzle is turned into the approximate position shown in dotted lines in such figure.

From the above description it will be apparent that we have devised a useful and simple tire pressure gauge which will enable the motorist to ascertain at a glance the air pressure in his tires before and during the process of inflating them. Furthermore we have constructed a device which can be readily applied to any existing air line, and which is simple both in operation and construction.

What we claim for our invention is:—

1. A combined air line nozzle and pressure gauge comprising an elongated casing having a tubular handle portion at one end for connection with an air line and provided with an air inlet valve chamber therein, a nozzle chamber at the opposite end of said casing, a longitudinal chamber opening at its outer end into the nozzle chamber, and an air passage paralleling the longitudinal chamber and connecting the nozzle chamber with the valve chamber, said handle portion being elongated and extending lengthwise of and from the longitudinal chamber; a valve operable in the valve chamber for controlling communication between the same and the air passage, a spring contained within the chamber of the handle portion for seating the valve, means for unseating the valve, a gauge mounted for movement lengthwise of and in the longitudinal chamber and operable in response to air pressure in the nozzle chamber, and a nozzle secured in and closing the nozzle chamber.

2. A combined air line nozzle and pressure gauge comprising a body having a nozzle chamber and an adjacent gauge chamber opening at one end into the nozzle chamber, a gauge arranged within said gauge chamber and displaceable therefrom through the nozzle chamber, said gauge comprising a head slidable within the gauge chamber and an anchor member secured in said open end of the gauge chamber and attached to said slidable head, said head being removable as a unit with said anchor member through said open end and nozzle chamber, said gauge chamber being provided with a window through which the gauge is read, and a nozzle secured in said nozzle chamber and acting therewith to inclose and conceal the anchor member.

3. A combined air line nozzle and pressure gauge comprising a body having a nozzle chamber and a gauge chamber opening at one end into the nozzle chamber and having a gauge stop at its opposite end, said gauge chamber being provided in one wall with a longitudinal slot constituting a window; and a gauge comprising a head slidably guided within said gauge chamber and having a part movable along the window-forming slot for indicating pressure readings, and pressure responsive means arranged within the chamber and connected to the head for actuating the same, said pressure responsive means and head being removable as an entirety from said gauge chamber through the nozzle chamber of said body, and said head being limited in its pressure actuated movement by said stop; and a nozzle arranged in said nozzle chamber and serving to prevent unauthorized displacement of the gauge from its chamber.

4. A combined air line nozzle and pressure gauge comprising a body having a nozzle chamber and a gauge chamber opening at one end into the nozzle chamber, said gauge chamber being provided in one wall with a window, a head slidably guided within said gauge chamber and readable through the window, an anchor member secured in the open end of the gauge chamber and accessible only through the nozzle chamber, a coil spring connecting the anchor member to the head member, an expansible pressure-responsive member arranged within said spring and anchored to said anchor member for exerting pressure against the head, said spring serving as a housing for said expansible member to confine its lateral expansion, and a nozzle secured to said body within the nozzle chamber and concealing the anchor member.

5. A combined air line nozzle and pressure gauge comprising a body having a nozzle chamber and a gauge chamber opening into the nozzle chamber; a gauge arranged within said gauge member and displaceable therefrom through the nozzle chamber, means for securing the gauge against displacement, said gauge chamber being provided with a window for reading the gauge, and a nozzle removably engaged in the nozzle chamber and protecting said securing means against being tampered with.

LEON ARTHUR HALLSTEAD.
HERBERT DAWSON.